(12) United States Patent
Matsui et al.

(10) Patent No.: US 6,259,662 B1
(45) Date of Patent: Jul. 10, 2001

(54) DISK ROTATION CONTROL DEVICE

(75) Inventors: Shigeru Matsui; Kazuhiro Sugiyama; Yukari Hiratsuka; Noboru Yashima; Naoki Kizu, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/210,588

(22) Filed: Dec. 14, 1998

(30) Foreign Application Priority Data

Feb. 10, 1998 (JP) .................................................. 10-028497

(51) Int. Cl.[7] ........................................................ G11B 7/00
(52) U.S. Cl. ........................... 369/47.48; 369/53.41; 369/47.1
(58) Field of Search .................................. 369/47, 48, 49, 369/50, 54, 58, 59, 47.1, 47.28, 47.3, 47.35, 47.46, 47.48, 53.1, 53.2, 53.4; 360/48, 51, 53

(56) References Cited

U.S. PATENT DOCUMENTS 5,751,676 * 5/1998 Kusano et al. ......................... 369/50
5,757,750 * 5/1998 Uemura ................................ 369/50
5,982,728 * 11/1999 Okamoto et al. ...................... 369/54

FOREIGN PATENT DOCUMENTS 6338127    6/1994   (JP) .
7240064   12/1995   (JP) .

* cited by examiner

*Primary Examiner*—Muhammad Edun
(74) *Attorney, Agent, or Firm*—Birch, Stewart, Kolasch & Birch, LLP

(57) ABSTRACT

When a detected value of the signal processing speed from a frequency comparator is larger than a prescribed value input from an input terminal, the rotation control of a disk is switched from constant linear velocity control to constant angular velocity control using an error signal from an arithmetic unit. Alternatively, when a detected value of the rotational velocity from a frequency comparator is larger than a prescribed value input form an input terminal, the rotation control of the disk is switched from the constant angular velocity control into the constant linear velocity control.

17 Claims, 10 Drawing Sheets

DISK ROTATION CONTROL DEVICE

BACKGROUND OF THE INVENTION

The present invention relates to a disk rotation control device, and more particularly to a spindle motor drive control circuit for an optical disk, for example.

In case of that a disk on which a digital signal is recorded in a manner of a constant linear velocity (CLV) is subjected to tracking by an optical pickup, it is driven at a decreasing rotational velocity as the optical pickup moves from the inner periphery of the disk to the outer periphery thereof. The rotational velocity of the disk is controlled by controlling the rotational velocity of a spindle motor in such a manner that a synchronous clock in synchronism with a signal reproduced from the disk provides a prescribed frequency. The synchronous clock is generated from the reproduced signal by a phase lock loop circuit.

An explanation will be given of an example of a DVD device.

FIG. 10 is a block diagram of a circuit for controlling a spindle motor in the DVD device. In FIG. 10, reference numeral 1 denotes a disk; 2, an optical pickup; 3, a spindle motor; 4, a drive amplifier of the spindle motor; 5, an analog signal processing circuit for equalizing a reproduced signal; 6, a circuit for digitally processing the reproduced signal; 7, a PLL circuit; 8, a frequency comparator; 9, a phase comparator; 10, an arithmetic unit; and 11, a PWM signal generation circuit.

An explanation will be given of the operation of the DVD device. The disk 1 is activated by the drive amplifier 4. A signal reproduced is from the disk 1 and read by the optical pickup 2. The signal is wave-equalized by the analog signal processing circuit 5. The data in the reproduced signal are processed by the digital signal processing circuit 6. Then, the synchronizing signal recorded at prescribed intervals are also extracted. A channel clock (synchronous clock for data read in synchronism with the reproduced signal) is generated by the PLL (phase-locked loop) circuit 7.

The channel clock is supplied to the frequency comparator 8. On the other hand, in the DVD device, the channel clock central frequency when the disk 1 is rotated at a constant linear velocity is 26.16 MHz. The clock at this frequency is also supplied to the frequency comparator 8 as a reference clock by a quartz oscillator. In the frequency comparator 8, the channel clock extracted from the PLL circuit 7 is compared with the reference clock to provide a frequency error signal.

Like the frequency comparator 8, the phase comparator 9 is also supplied with the reference clock at 26.16 MHz. The reference clock is divided at recording intervals of the synchronizing signal (the period of the divided clock is equal to that of the synchronizing signal when the disk 1 is rotated at a constant linear velocity). The divided clock is phase-compared with the synchronizing signal to provide a phase error signal.

The frequency error signal and phase error signal are supplied to the arithmetic unit 10. They are multiplied by an integer and gain-adjusted. Further, they are added to provide an output. An error signal output from the arithmetic unit 10 is supplied to the PWM signal generation circuit 11 for its PWM(pulse wide module) conversion. The PWM converted error signal is supplied to the amplifier. The rotational velocity of the spindle motor 3 is controlled so that the amplifier can cancel the PWM error signal. Thus, the disk is rotated at a constant linear velocity.

As described above, in the DVD device, the rotation control of the spindle motor 3 is performed in a CLV system with a constant linear velocity. However, unlike the CAV system with a constant angular velocity, in a track jump, e.g. from an inner periphery to an outer periphery and vice versa other than normal reproduction, the rotation speed of the disk 1 varies greatly. Therefore, it takes a long time to establish the spindle motor in a state of a constant linear velocity again by inertia of the disk so that the signal can be read. This problem can be solved by reading the signal in the CAV system to improve access capability. However, when the DVD signal recorded in the CLV system is read (reproduced) by the CAV system, the frequency of the reproduced signal increases toward the outer periphery. The reproduced signal must be processed correspondingly at a higher speed.

The access speed of a memory used for a storage circuit in the digital signal processing circuit at a later stage has a limit. The PLL circuit must in a wide frequency band. Further, on the inner periphery, only low speed processing is permitted so that enhancement of the rotational velocity of the disk is limited.

SUMMARY OF THE INVENTION

The present invention has been accomplished in order to solve the above problem. The present invention intends to provide a disk rotation control device which can change a manner of controlling the disk rotation between a constant angular velocity (CAV) control with emphasis on improvement of access capability on the inner periphery of a disk and a constant liner velocity (CLV) control suppressing an increase in the signal processing speed on the outer periphery of the disk.

A disk rotation control device according to the present invention comprises: a pulse generator for generating a pulse for each rotation of a disk; a first control controlling rotation of the disk in terms of a constant angular velocity in response to an output pulse from the pulse generator; a signal generator generating a signal in synchronism with a reproduced signal from the disk; a second control controlling the rotation of the disk in terms of a constant linear velocity using the signal generated by the signal generator; a detector for detecting a signal processing speed of the signal; a comparator for comparing a value of the processing speed detected by the detector and a prescribed value; and a switch element for switching the rotation of the disk from the first control to the second control when the value of the signal processing speed detected by the detector exceeds the prescribed value.

Another disk rotation control device according to the present invention comprises: a pulse generator for generating a pulse for each rotation of a disk; a first control controlling rotation of the disk in terms of a constant angular velocity in response to an output pulse from the pulse generator; a signal generator for generating a signal in synchronism with a reproduced signal from the disk; a second control controlling the rotation of the disk in terms of a constant linear velocity using the signal generated by the signal generator; a detector detecting a rotational velocity of the disk from the first control; a comparator for comparing a value of the rotational velocity detected by the detector and a prescribed value; and a switch element switching the rotation of the disk from the second control to the first control when the value of the rotational velocity detected by the detector exceeds the prescribed value.

Still another disk rotation control device comprises: a pulse generator for generating a pulse for each rotation of a disk; a first control controlling rotation of the disk in terms of a constant angular velocity in response to an output pulse from the pulse generator; a signal generator for generating a signal in synchronism with a reproduced signal from the disk; a second control controlling the rotation of the disk in terms of a constant linear velocity using the signal generated by the signal generator; a signal processing speed detector for detecting a signal processing speed of the reproduced signal; a first comparator for comparing a value of the processing speed detected by the processing speed detector and a prescribed value; a first switching means for switching the rotation control of the disk from the first control to the second control when the value of the signal processing speed detected by the processing speed detector exceeds the prescribed value; a rotation velocity detector for detecting a rotational velocity of the disk from the first control; a second comparator comparing a value of the rotational velocity detected by the rotational velocity detector and a prescribed value; and a second switch element switching the rotation of the disk from the second control means to the first control when the value of the rotational velocity detected by the detector exceeds the prescribed value.

A further disk rotation control device according to the present invention comprises: a signal generator for generating a signal in synchronism with a reproduced signal from a disk; a control controlling the rotation of the disk in terms of a constant linear velocity using the signal generated by the signal generator; a detector detecting whether or not a velocity error signal is not larger than a prescribed value in the control; and an accelerator supplying an accelerating signal for accelerating the disk when the velocity error signal is not larger than the prescribed value, and canceling the accelerating signal when the error signal is not smaller than the prescribed value.

A still further disk rotation control device comprises: a signal generator generating a signal in synchronism with a reproduced signal from a disk; a control controlling the rotation of the disk in terms of a constant linear velocity using the signal generated by the signal generator; a detector detecting whether or not a velocity error signal is not smaller than a prescribed value in the control; and a decelerator for supplying a decelerating signal for decelerating the disk when the velocity error signal is not larger than the prescribed value, and canceling the decelerating signal when the error signal is not smaller than the prescribed value.

A further disk rotation control device comprises: a signal generator generating a signal in synchronism with a reproduced signal from a disk; a control controlling the rotation of the disk in terms of a constant linear velocity using the signal generated by the signal generator; a first and a second detector detecting whether or not a velocity error signal is not smaller than a prescribed value in the control; and an accelerating and decelerating element for supplying an accelerating signal for accelerating the disk when the velocity error signal is not larger than the prescribed value, and supplying a decelerating signal for decelerating the disk when the error signal exceeds the prescribed value.

A further disk rotation control device comprises: a signal generator for generating a signal in synchronism with a reproduced signal from a disk; a control controlling the rotation of the disk in terms of a constant linear velocity using the signal generated by the signal generator; a synchronizing (sync) signal evaluator detecting a sync signal on the basis of a reproduced signal from the disk to decide whether or not the sync signal has been detected at prescribed intervals; a measurement circuit which is initialized when the sync signal has been detected at prescribed intervals and measures an interval using a reference signal when the sync signal has not been detected at the prescribed intervals; a comparator comparing a measured value from the measurement circuit and a prescribed value; and a switch element halting the control operation of the control and holding the rotation of the disk when the measured value is not smaller than the prescribed value.

A further disk rotation control device comprises: a pulse generator for generating a pulse each rotation of the disk; a first control controlling rotation of the disk in terms of a constant angular velocity in response to an output pulse from the pulse generator; a signal generator generating a signal in synchronism with a reproduced signal from the disk; a second control for controlling the rotation of the disk in terms of a constant linear velocity using the signal generated by the signal generator; a sync signal evaluator detecting a sync signal from a reproduced signal from the disk to decide whether or not the sync signal has been detected at prescribed intervals; a measurement circle which is initialized when the sync signal has been detected at prescribed intervals and measures an interval using a reference signal when the sync signal has not been detected at the prescribed intervals; a comparator for comparing a measured value from the measurement circle and a predetermined value; and a switching element switching the rotation control of the disk from the second control into the first control when the measured value is not smaller than the prescribed value.

A further disk rotation control device comprises: a pulse generator for generating a pulse for each rotation of a disk; a first control for controlling rotation of the disk in terms of a constant angular velocity in response to an output pulse from the pulse generator; a signal generator generating a signal in synchronism with a reproduced signal from the disk; a second control for controlling the rotation of the disk in terms of a constant linear velocity using the signal generated by the signal; a sync signal for detecting a sync signal on the basis of a reproduced signal from the disk to decide whether or not the sync signal has been detected at prescribed intervals; a measurement circuit which is initialized when the sync signal has been detected at prescribed intervals and measures an interval using a reference signal when the sync signal has been detected at the prescribed intervals; a first comparator for comparing a measured value from the measurement circuit and a first prescribed value; a second comparator for comparing a measured value from the measurement circuit and a second prescribed value; and a switching element for halting the control operation of the second control and holding the rotation of the disk when the measured value is not smaller than the first prescribed value, and switching the rotation control of the disk from the second control to the first control when the measured value is not smaller than the second prescribed value.

In the disk rotation control device according to the present invention, when a detected value from a signal processing speed detector is larger than a prescribed value as a result of comparison by a comparator, the rotation control of a disk is switched from a first control into a second control.

When a detected value from a rotational velocity detecting means is larger than a prescribed value as a result of comparison by the comparator, the rotation control of a disk is switched from the second control to the first control.

When a detected value from a signal processing speed detector is larger than a first prescribed value as a result of comparison by a first comparator, the rotation control of a disk is switched from the first control into the second control, and when the detected value from the rotational velocity detector is larger than a second prescribed value as a result of comparison by a second comparator, the rotation control of a disk is switched from the second control to the first control.

When a velocity error signal is not larger than a prescribed value as a result of detection by a detector, an accelerating signal for accelerating a disk is supplied from an accelerator to the control, and when the velocity error signal is not smaller than the prescribed value, the accelerating signal is canceled.

When the velocity error signal is not smaller than a prescribed value as a result of detection by the detector, a decelerating signal for decelerating a disk is supplied from a decelerator to the control, and when the velocity error signal is not larger than the prescribed value, the decelerating signal is canceled.

When the velocity error signal is not larger than the prescribed value as a result of detection by a first detector, the accelerating signal for accelerating the disk is supplied from the accelerator to the control, and when the velocity error signal is not smaller than the prescribed value, the accelerating signal is canceled; and when the velocity error signal is not smaller than a prescribed value as a result of detection by a second detector, the decelerating signal for accelerating the disk is supplied from the decelerator to the control, and when the velocity error signal is not larger than the prescribed value, the decelerating signal is canceled.

When a synchronizing (sync) signal has been detected at prescribed intervals as a result of evaluation by a sync signal evaluator, a measurement circuit is initialized, and when the synchronizing signal has not been detected at the prescribed intervals, the intervals are measured using a reference signal by a measurement circuit. The value measured by the measurement circuit is compared with a prescribed value by a comparator, and when the former is not smaller than the latter, the control operation is halted and the rotation of the disk is held by a switch element.

When the sync signal has been detected at prescribed intervals as a result of evaluation by the sync signal evaluator, the measurement circuit is initialized, and when the sync signal has not been detected at the prescribed intervals, the intervals are measured using the reference signal by the measurement circuit. The value measured by the measurement circuit is compared with the prescribed value by the comparator, and when the former is not smaller than the latter, the control of disk rotation is switched from the second control into the first control by the switch element.

When the sync signal has been detected at prescribed intervals as a result of evaluation by the sync signal evaluator, the measurement circuit is initialized, and when the sync signal has not been detected at the prescribed intervals, the intervals are measured using the reference signal by the measurement circuit. The value measured by the measurement circuit is compared with a first and second prescribed values by a first comparator and a second comparator, respectively, and when the measured value is not smaller than the first prescribed value, the control of disk rotation is halted and the rotation of the disk is held, and when the measured value is not smaller than the second prescribed value, it is switched from the second control to the first control by the switch element.

DETAILED DESCRIPTION OF THE PREFERRED EMBODIMENTS

Hereinafter, referring to drawings showing embodiments, an explanation will be given of the present invention.

Embodiment 1

Figure 1:
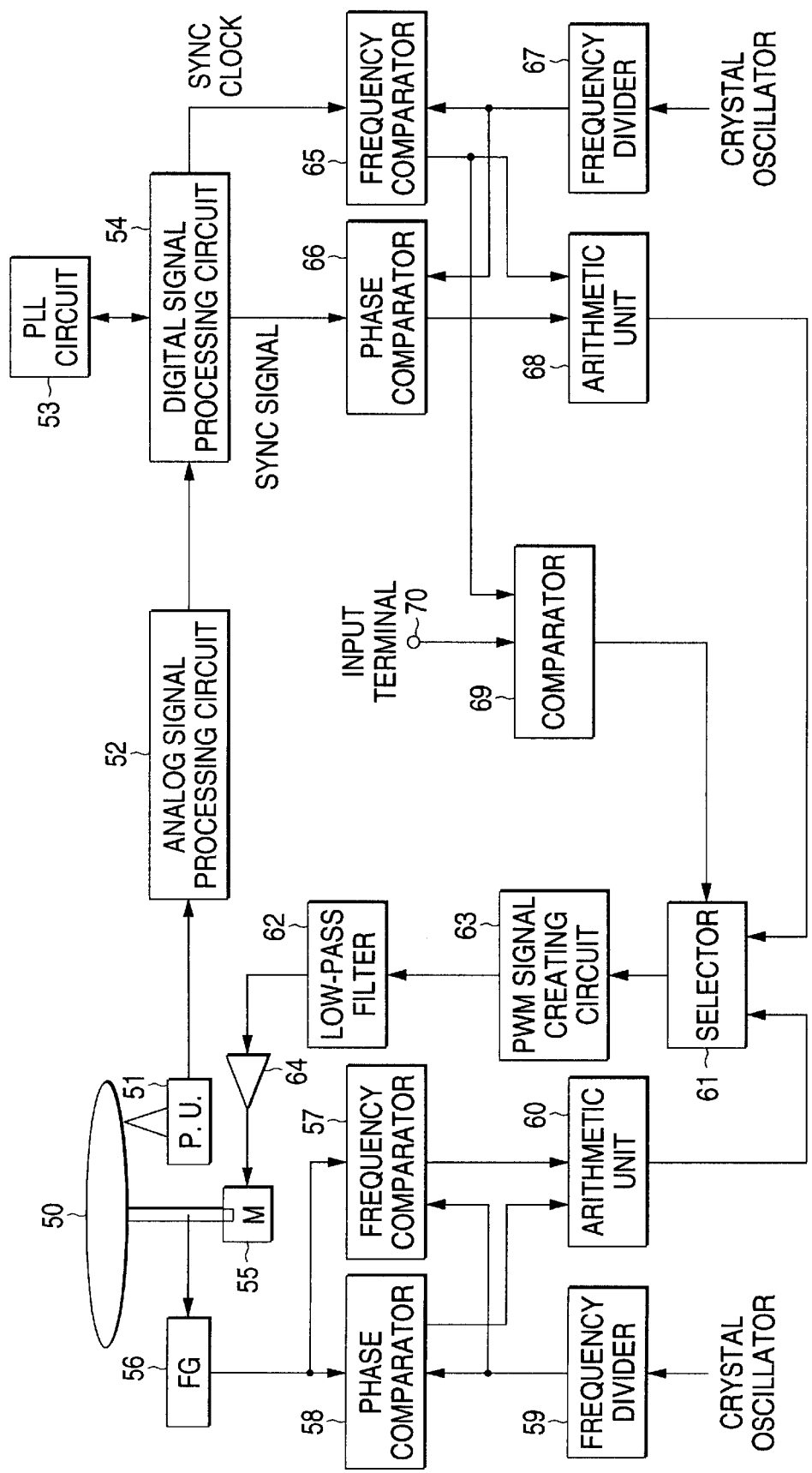
FIG. 1 is a block diagram showing a disk rotation control device according to the first embodiment of the present invention.

FIG. 1 is a block diagram showing an example of a disk rotation control device according to the first embodiment of the present invention.

In FIG. 1, reference numeral 50 denotes a disk, 51 an optical pickup, 52 an analog signal processing circuit for equalizing a reproduced signal, 53 a PLL circuit for generating a clock in synchronism with a reproduced data, and 54 a digital signal processing circuit.

Reference numeral 55 denotes a spindle motor; 56, a pulse generator which generates a plurality of pulses for one revolution of the spindle motor; 57, a frequency comparator; 58, a phase comparator; 59, a frequency divider for dividing a clock supplied from a quartz oscillator; 60, an arithmetic unit; 61, a selector; 62, a low-pass filter; 63, a PWM signal generation circuit; and 64, an amplifier for driving a spindle motor.

Reference numeral 65 denotes a frequency comparator; 66, a phase comparator; 67, a frequency divider for dividing a clock supplied from a quartz oscillator; 68, an arithmetic unit; and 69, a comparator for comparing a prescribed frequency value input from an input terminal 70 with the measured frequency value produced from the frequency comparator 65.

An explanation will be given of the operation of the disk rotation control device. After initializing, the disk 50 starts to rotate, and focus/track control is performed within the optical pickup 51. Spindle control will be carried out using the pulse generator 56. Where a prescribed frequency division ratio is set in the frequency divider, assuming that the frequency of the quartz oscillator supplied to the frequency divider 59 is f, the number of rotations of the disk 50 rotating at a constant velocity is n, and the number of output pulses from the pulse generator 56 for each revolution of the disk 50 is k, the frequency division rate M can be acquired by $$M=n/fk \qquad (1)$$

The frequency comparator 57 measures the interval of the pulses supplied from the pulse generator 56 using the quartz oscillator. If the disk 50 is rotating at a prescribed number of revolutions, the above frequency division ratio is equal to the frequency measured value in the frequency comparator 57. If not, an error is generated. The frequency comparator 57 produces an error value for the above division ratio for each pulse. The phase comparator 58 compares the phase of the output signal from the frequency divider 59 with that of the output timing of a pulse output from the pulse generator. If the timing of the output pulse is out of phase from the output signal from the frequency divider 59, the error is measured and output.

The outputs from the frequency comparator 57 and phase comparator 58 are supplied to the arithmetic unit 60. They are multiplied by an integer for gain adjustment and added. The output of the added error is supplied to the PWM signal generation circuit 63 through the selector 61. The error is PWM-modulated by the PWM signal generation circuit 63. The output signal therefrom is supplied to the low-pass filter 62 to remove its high frequency component of the signal. Incidentally, in FIG. 1, the low-pass filter 62 is so configured that it outputs the error signal after PWM-modulated by the PWM signal generation circuit 63 on the assumption of an analog circuit, but may be configured as a digital filter. In this case, the PWM signal generating circuit 63 is not required since the operation of converting the error into the variation in a time axis by the PWM modulation.

The output from the low-pass filter 62 is supplied to the amplifier 64. Then, the spindle motor is controlled so that the error in the frequency and phase is canceled. Where there is no error in the frequency and phase, the disk 50 rotates at a prescribed number of revolutions. Thus, the disk 50 is controlled at CAV (constant angular velocity).

When the reproduced signal is in a readable state under application of focus or tracking servo, the output from the optical pickup 51 is supplied to the analog signal processing circuit 52 to make equalizing or binary-digitizing of the data. The reproduced signal processed by the analog signal processing circuit 52 is supplied to the digital signal processing circuit 54. The digital signal processing circuit 54, after having extracted a synchronizing (sync) signal, performs the signal processing such as error correction. The equalized reproduced signal is also supplied to the PLL circuit 53 in which a clock in phase with the data is generated on the basis of the sync signal. The clock is supplied to the digital signal processing circuit 54 and used for data read.

The clock in phase with the reproduced signal is also supplied from the PLL circuit 53 to the succeeding comparator 65. On the other hand, a reference clock is supplied from the quartz oscillator to the frequency divider 67. The clock is frequency-divided at a prescribed frequency division rate and thereafter is supplied to the frequency comparator 65 as a reference clock. In the frequency comparator 65, the number of clocks input from the PLL circuit 53 is measured within one period of the reference clock. The measured value is compared with a target value, i.e. a measured value when the disk 50 is rotating at a constant liner velocity (constant if the linear velocity is constant). The error is produced as a frequency error signal.

Since the sync signal is recorded on the disk at prescribed intervals of the reproduced signal, the digital signal processing circuit 54 produces the sync clock obtained by dividing the clock from the PLL circuit 53 so as to be in phase with the sync signal (where the clock output from the PLL circuit 53 is in phase with the reproduced signal, i.e. the sync signal. The sync clock is used as a reference signal for data discrimination in the digital signal processing circuit 54. On the other hand, the frequency divider 67 generates a clock for phase error detection divided to correspond to the division rate when the sync clock is generated from the clock output from the PLL circuit 53 (the frequency of the clock for phase error detection thus frequency-divided is equal to that of the sync clock when the disk 50 is rotating at a linear constant velocity. In the phase comparator 66, the phase of the sync clock is compared with that of the output timing of the clock for phase error detection. If they are out of phase from each other, the phase error is measured and output as a phase error signal from the phase comparator 66.

Both frequency error signal and phase error signal are supplied to the arithmetic unit 68, and multiplied by an integer for gain adjustment, and added. An output from the arithmetic unit is supplied to the selector 61. If the frequency and phase error output from the arithmetic unit 68 is selected, this signal is supplied to the PWM signal generation circuit 63. Thus, the disk 50 will be placed under CLV control.

If the disk 50 is CAV-controlled in the above operation, when the optical pickup 51 is moved from the inner periphery to the outer periphery and vice versa, the number of revolutions of the disk 50 is not required to vary. Thus, the PLL circuit 53 is likely to be synchronized again after the pickup 51 has moved, thereby improving access capability. Therefore, on the side of the inner periphery of the disk 50, the output from the arithmetic unit 60 is selected. However, in the optical disk such as DVD, CD, etc. at a constant linear velocity, the frequency of the reproduced signal increases toward the outer periphery so that the frequency of the clock from the PLL circuit 53 increases correspondingly.

In the comparator 69, the value of the frequency measured by the frequency comparator (which increases toward the outer periphery) is compared with a prescribed value input from an input terminal 70. Now it is assumed that the prescribed value input from the input terminal 70 is a value measured by the frequency comparator 65 where the device operates at the upper limit of the clock frequency which can be phase-locked by the PLL circuit 53 or at that of the signal frequency which can be processed by the digital signal processing circuit 54.

If the frequency measured by the frequency comparator 65 is equal to or higher than the prescribed value, the selector 68 selects the error signal from the arithmetic unit 68. As a result, the rotation control is shifted to the CLV control. Thus, the reproduced signal frequency ceases to increase and is controlled so as to be constant. Therefore, the clock output from the PLL circuit 53 ceases to increase. In the digital signal processing circuit 54, a check is put on an increase in the signal processing speed.

In the operation of the first embodiment described hitherto, the comparator 69 permits suitable disk rotation control corresponding to a reproducing position of constant angular velocity (CAV) control with emphasis on improvement of access capability on the inner periphery of the disk 50 and a constant liner velocity (CLV) control for suppressing an increase in the signal processing speed on the outer periphery.

Figure 2:
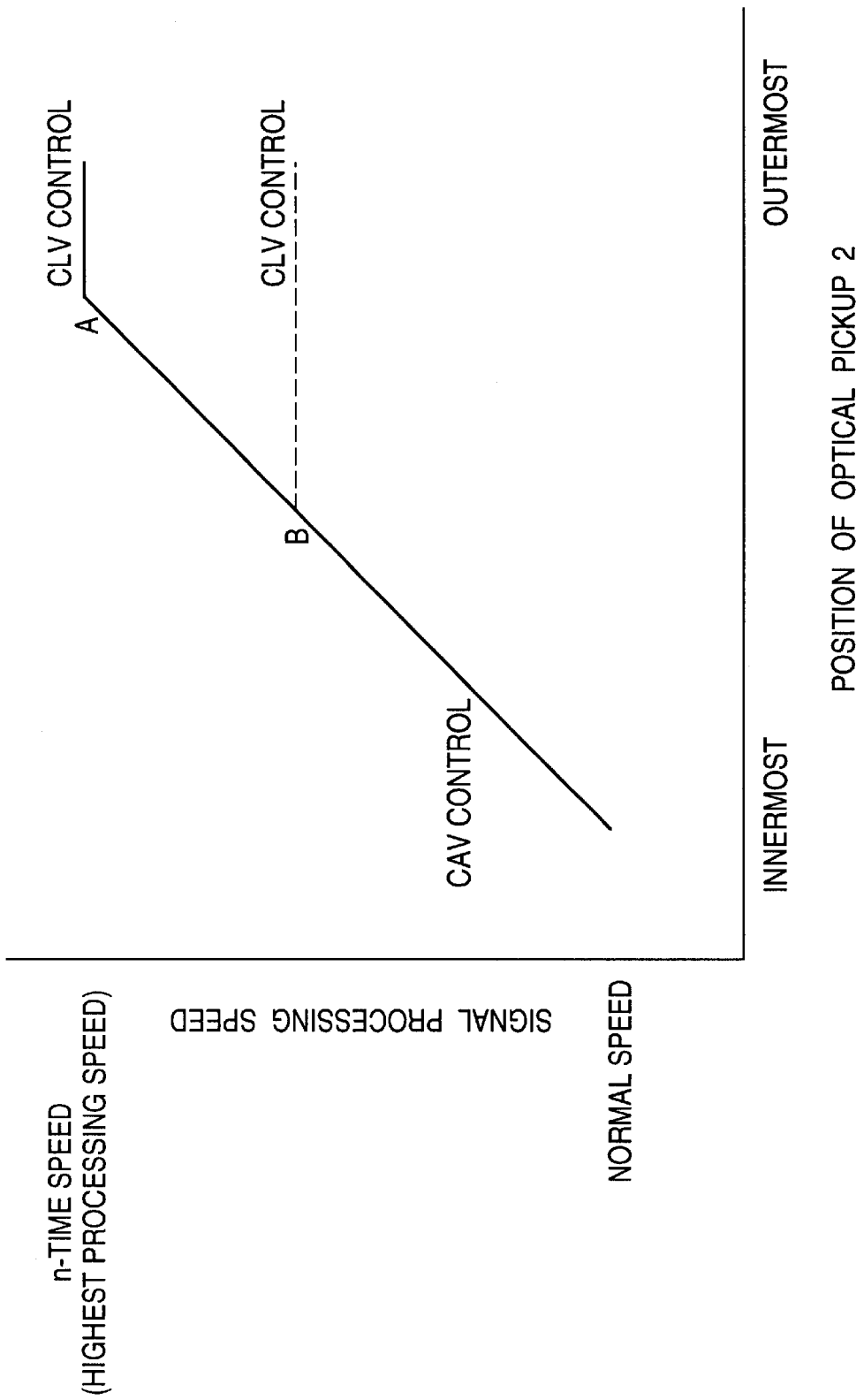
FIG. 2 is a graph for explaining the operation of the disk rotation control device according to the first embodiment of the present invention.

The prescribed value input from the input terminal 70 should not be limited to a threshold value indicative of the highest processing speed, but may be an optional value for the shift from CAV to CLV. As seen from FIG. 2, with threshold values of points A and B being set, the outer periphery and inner periphery from the respective points are placed in the CLV control and CAV control, respectively. Incidentally, it should be noted that in FIG. 2, on the innermost periphery, the CAV control is made at the one-time processing speed and the highest processing speed is n-times speed.

Embodiment 2

Figure 3:
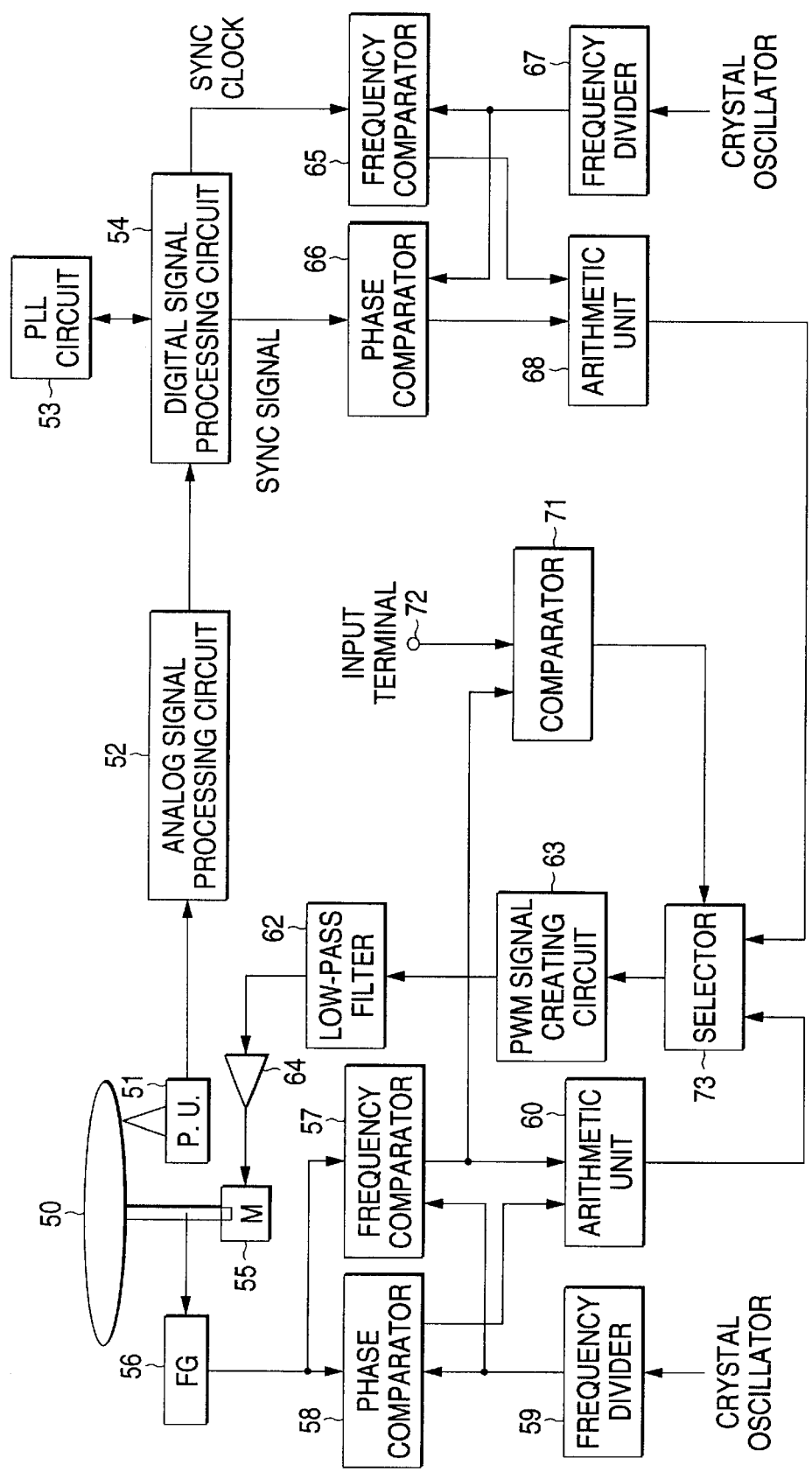
FIG. 3 is a block diagram showing a disk rotation control device according to the second embodiment of the present invention.

FIG. 3 is a block diagram showing an example of the disk rotation control device according to the second embodiment of the present invention. In FIG. 3, like reference numerals refer to like parts in FIG. 1. In FIG. 3, reference numeral 71 denotes a comparator, 72 an input terminal for a prescribed value, and 73 a selector.

An operation will be given of the operation. Where the optical pickup 51 is jumped from the outer periphery of the disk 50 to the inner periphery thereof, with the CLV control being carried out, the number of revolutions of the spindle motor 55 increases toward the inner periphery of the disk. The interval between the pulses (pulse frequency) generated by the pulse generator 56, which has been measured by the frequency comparator 57 and increases toward the inner periphery during the CLV control, is compared with the prescribed value input from the input terminal 72. It is assumed that the prescribed value is a value measured by the frequency comparator 57 when the spindle motor 55 rotates at a prescribed velocity.

As a result of comparison in the comparator 71, if the frequency measured by the frequency comparator 57 is equal to or higher than the prescribed value, the selector 73 selects the error signal from the arithmetic unit 60. As a result, the rotation control is shifted to the CAV control. Thus, the number of revolutions of the spindle motor 55 ceases to increase and is controlled so as to be constant. In this way, excessive rotation on the inner periphery can be prevented.

In the operation of the second embodiment described hitherto, using the comparator 71, on the outer periphery, the signal processing is made at the highest speed under the CLV control, and on the inner periphery, because of shift to the CAV control based on the reduction of the signal processing speed, an increase can be suppressed in the number of revolutions of the spindle motor 55 under the CLV control and hence in the oscillation or power consumption.

Figure 4:
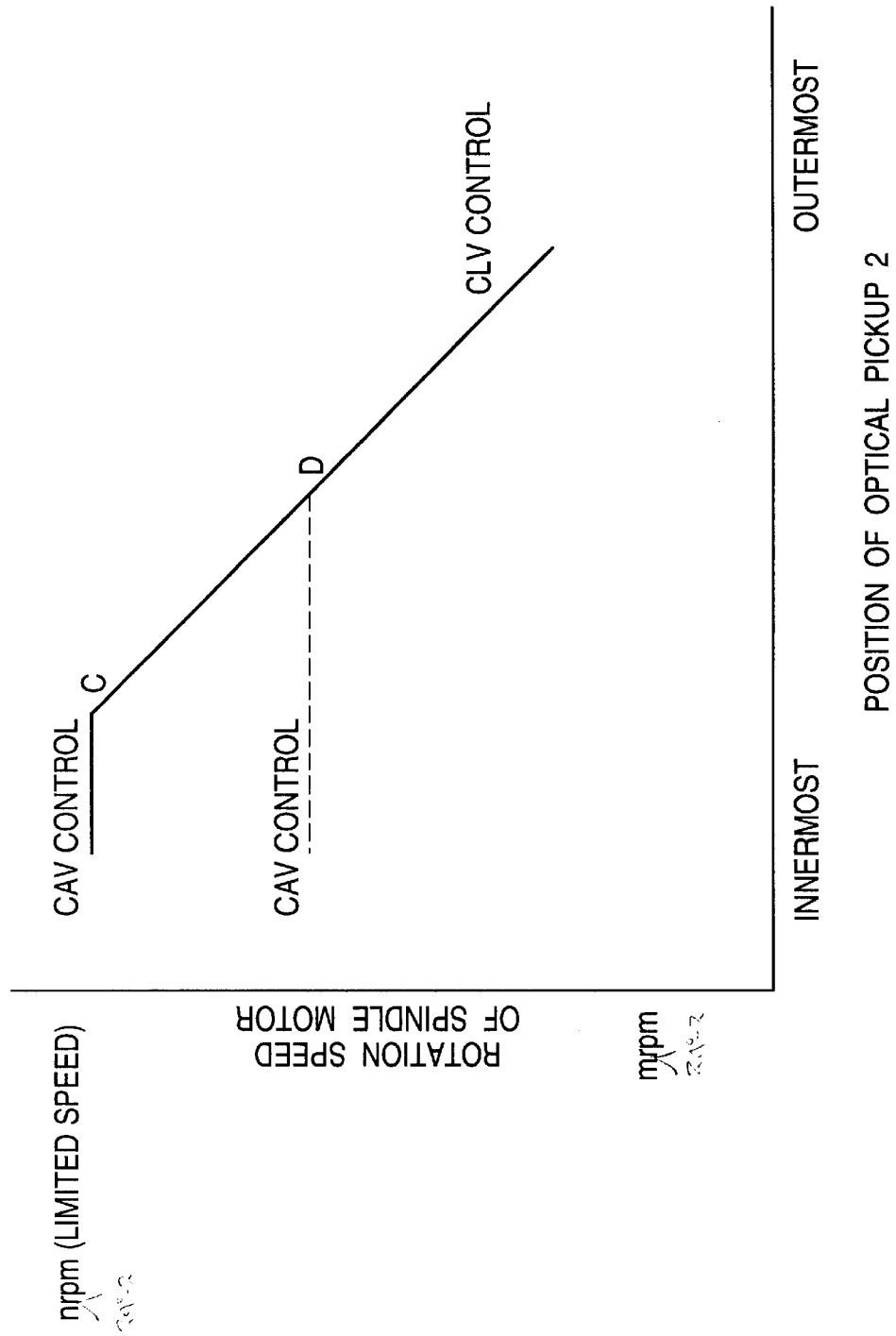
FIG. 4 is a graph for explaining the operation of the disk rotation control device according to the second embodiment of the present invention.

The prescribed value input from the input terminal 72 should not be limited to a threshold value indicative of the value when the spindle motor 55 rotates at a threshold velocity, but may be an optional value for the shift from CLV to CAV. In this case, as seen from FIG. 4, with threshold values of points C and D being set, the outer periphery and inner periphery from the respective points are placed in the CLV control and CAV control, respectively. Incidentally, it should be noted that in FIG. 4, on the outermost periphery, the CLV control is made at m rpm and the threshold number of revolutions is n rpm.

Embodiment 3

Figure 5:
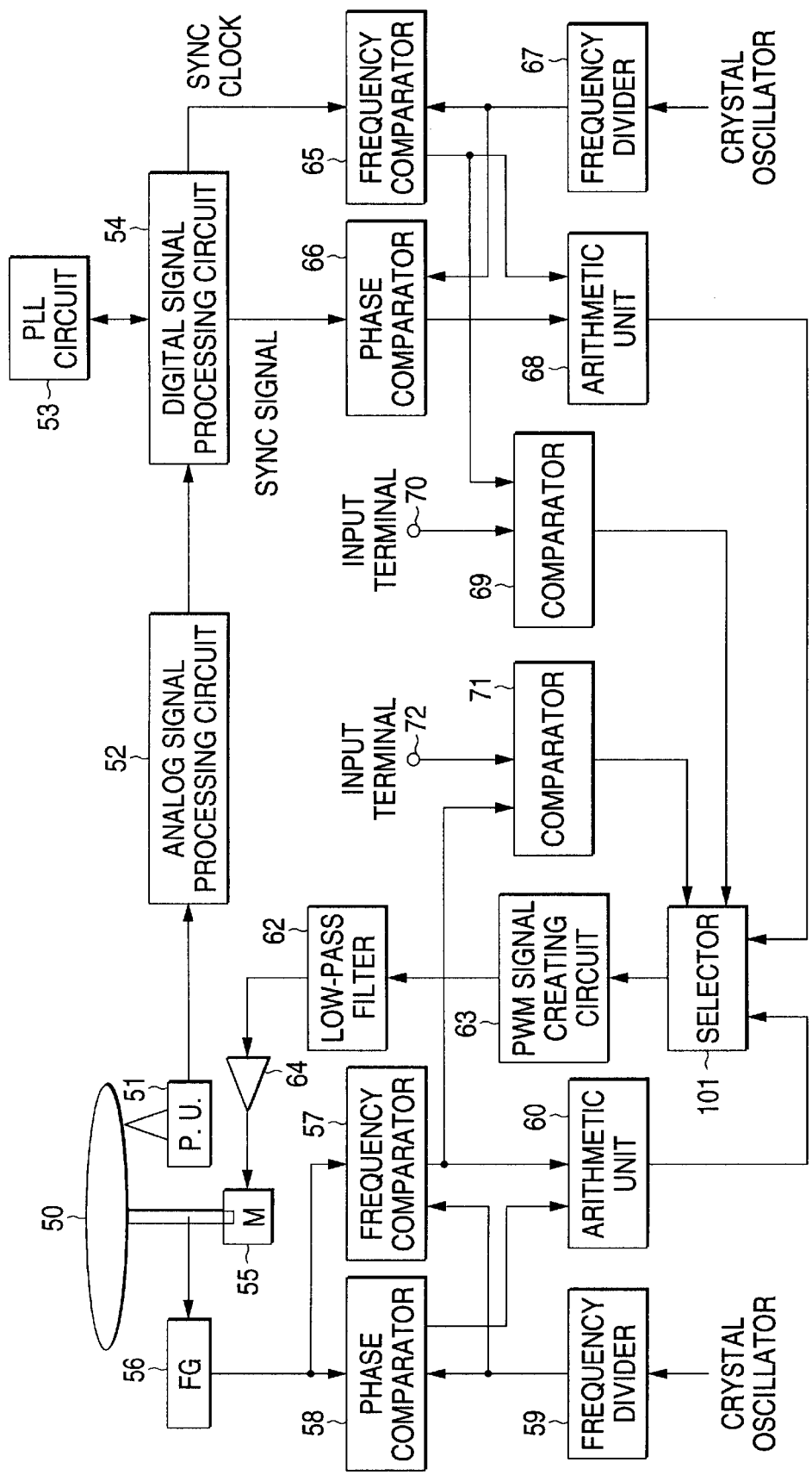
FIG. 5 is a block diagram showing a disk rotation control device according to the third embodiment of the present invention.

FIG. 5 is a block diagram showing an example of the disk rotation control device according to the third embodiment of the present invention. In FIG. 5, like reference numerals refer to like parts in FIGS. 1 and 3. In FIG. 3, reference numeral 101 denotes a selector.

An operation will be given of the operation. Where the optical pickup 51 is jumped from the inner periphery of the disk 50 to the outer periphery thereof, with the CAV control being carried out, the signal processing speed increases toward the outer periphery of the disk. The frequency value measured by the frequency comparator 57 (which increases toward the outer periphery during the CAV control) is compared with the prescribed value input from the input terminal 69. Now it is assumed that the prescribed value input from the input terminal 70 is a value measured by the frequency comparator 65 where the device operates at the upper limit of the clock frequency which can be phase-locked by the PLL circuit 53 or at that of the signal frequency which can be processed by the digital signal processing circuit 54.

As a result of comparison in the comparator 69, if the frequency measured by the frequency comparator 65 is equal to or higher than the prescribed value, the selector 101 selects the error signal from the arithmetic unit 68. As a result, the rotation control is shifted to the CLV control. Thus, the reproduced signal frequency ceases to increase and is controlled so as to be constant. Therefore, the clock output from the PLL circuit 53 ceases to increase.

Where the optical pickup 51 is jumped from the outer periphery of the disk 50 to the inner periphery thereof, with the CLV control being carried out, the number of revolutions of the spindle motor 55 increases toward the inner periphery of the disk. Therefore, in the comparator 71, the interval between the pulses (pulse frequency) generated by the pulse generator 56, which has been measured by the frequency comparator 57 and increases toward the inner periphery during the CLV control), is compared with the prescribed value input from the input terminal 72. It is assumed that the prescribed value is a value measured by the frequency comparator 57 when the spindle motor 55 rotates at a prescribed velocity.

As a result of comparison in the comparator 71, if the frequency measured by the frequency comparator 57 is equal to or higher than the prescribed value, the selector 101 selects the error signal from the arithmetic unit 60. As a result, the control rotation is shifted to the CAV control. Thus, the number of revolutions of the spindle motor 55 ceases to increase and is controlled so as to be constant. In this way, excessive rotation on the inner periphery can be prevented.

In the operation of the third embodiment described hitherto, the comparator 69 permits suitable disk rotation control corresponding to a reproducing position of constant angular velocity (CAV) control with emphasis on improvement of access capability on the inner periphery of the disk 50 and a constant liner velocity (CLV) control of putting a check on an increase in the signal processing speed on the outer periphery. On the other hand, by using the comparator 71, on the outer periphery, the signal processing can be made at the highest speed under the CLV control, and on the inner periphery, because of shift to the CAV control based on the reduction of the signal processing speed, an increase can be made in the number of revolutions of the spindle motor 55 under the CLV control and hence in the oscillation or power consumption.

Additionally, the prescribed value input from the input terminal 70 should not be limited to a threshold value indicative of the highest processing speed, but may be an optional value for the shift from CAV to CLV. Further, the prescribed value input from the input terminal 72 should not be limited to a threshold value indicative of the value when the spindle motor 55 rotates at a threshold velocity, but may be an optional value for the shift from CLV to CAV.

Accordingly, this lead to automatic switching into the CAV control on the inner periphery and that into the CLV control on the outer periphery.

Embodiment 4

Figure 6:
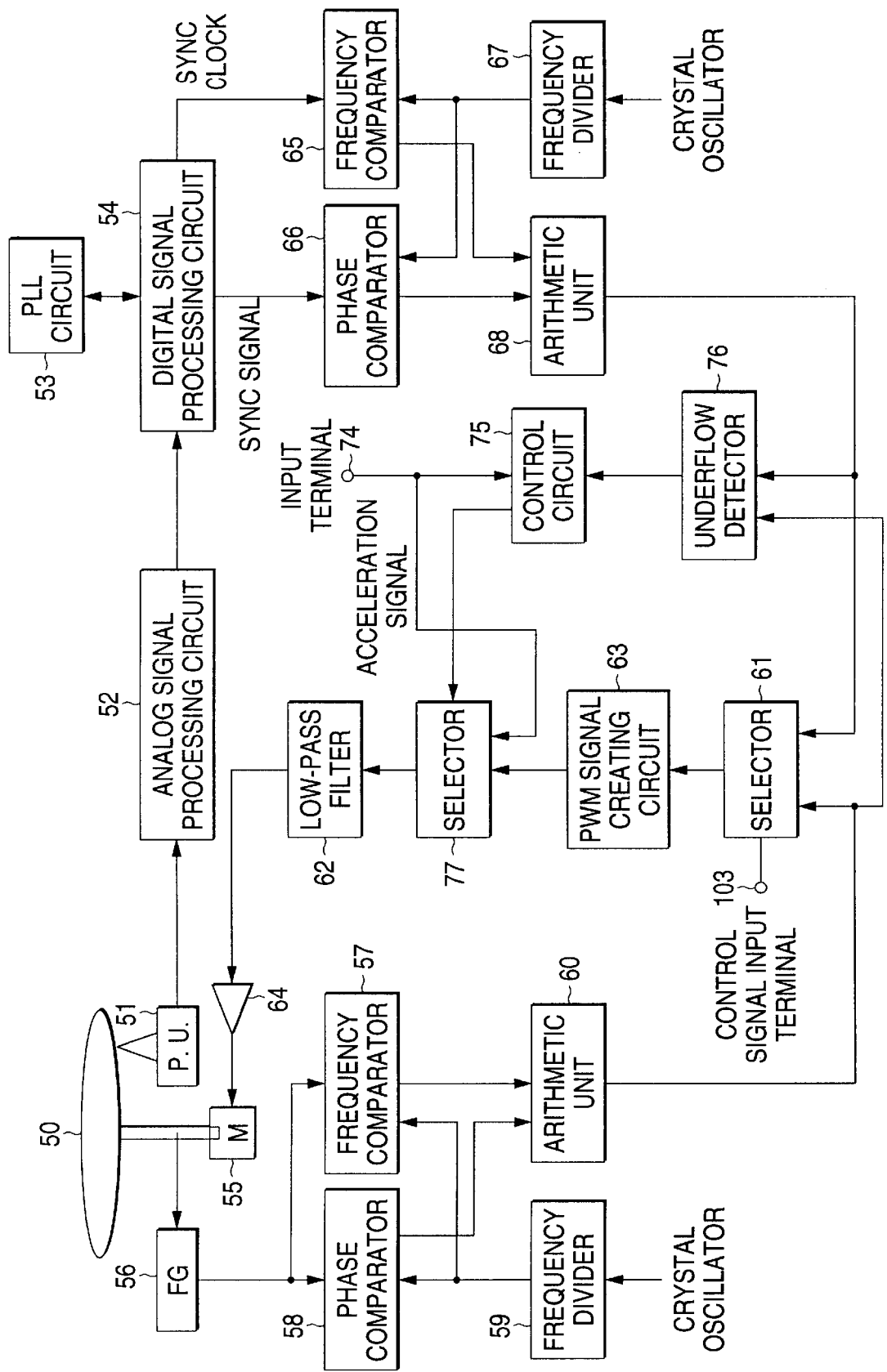
FIG. 6 is a block diagram showing a disk rotation control device according to the four embodiment of the present invention.

FIG. 6 is a block diagram showing an example of the disk rotation control device according to the fourth embodiment of the present invention. In FIG. 6, like reference numerals refer to like parts in FIG. 1. In FIG. 6, reference numeral 74 denotes an input terminal of an accelerating signal, 75 a control circuit, 76 an underflow detector, 77 a selector and 103 an input terminal.

An explanation will be given of the operation of the disk rotation control device according to the fourth embodiment of the present invention. An accelerating (or kicking) signal for the disk, supplied from the input terminal 74, is sent to the selector 77 and also to the control circuit 75. A control signal supplied from the input terminal 103 serves to switch the selector 61 between the outputs from the arithmetic units 60 and 68. On the other hand, in the underflow detector 76, the values of the error signal outputs from the arithmetic units 60 and 68 are compared with a prescribed value. As result of comparison, if the number of revolutions of the disk 50 is extremely low to require acceleration, an underflow signal is supplied to the control circuit 75. On the other hand, if the number of revolutions of the disk is close to that during the CAV control or CLV control, supply of the underflow signal is stopped.

The control circuit 75 produces a select signal which permits the selector 77 to produce the accelerating (kicking) signal from the input terminal 74 while the underflow signal is output from the underflow detector 76, and to produce the output from the PWM generation circuit 63 when the supply of the underflow signal is stopped. Thus, while the underflow signal is output, the disk 50 is in an accelerating state, and in other cases, the disk 50 will be controlled by the PWM signal.

Incidentally, if it is assumed that the prescribed value in the underflow detector 76 is an error signal value when the duty ratio of the PWM signal is 0% or 100%, the underflow signal is produced when the rotation of the disk is so low as to make it impossible to perform the PWM control. Thus, the accelerating signal can be forcibly sent from the input terminal 74 when the PWM control cannot be permitted. The accelerating signal can be canceled when the PWM control is permitted because the duty ratio of the PWM signal is within a range from 0 to 100%. However, it should be noted that the above prescribed value is not limited to the above error signal value, and may be set at any value permitting the accelerating signal to be canceled when the number of revolutions of the disk 50 exceeds a certain value.

Embodiment 5

Figure 7:
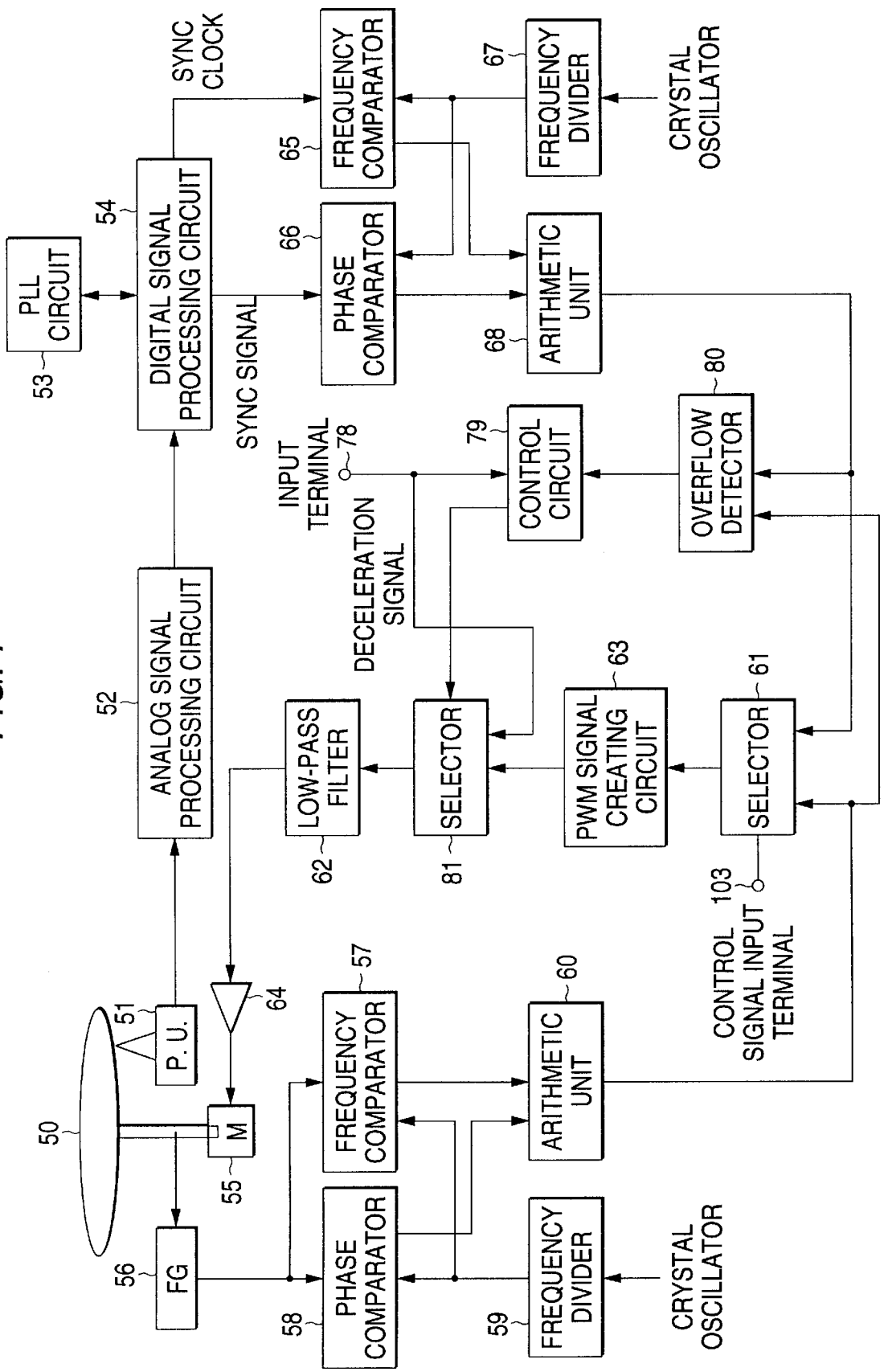
FIG. 7 is a block diagram showing a disk rotation control device according to the fifth embodiment of the present invention.

FIG. 7 is a block diagram showing an example of the disk rotation control device according to the fifth embodiment of the present invention. In FIG. 7, like reference numerals refer to like parts in FIG. 6. In FIG. 7, reference numeral 78 denotes an input terminal for an accelerating signal, 79 a control circuit, 80 an overflow detector, and 81 a selector.

An explanation will be given of the operation of the disk rotation control device according to the fifth embodiment of the present invention. A decelerating (or braking) signal for the disk, supplied from the input terminal 78, is sent to the selector 81 and also to the control circuit 79. A control signal supplied from the input terminal 103 serves to switch the selector 61 between the outputs from the arithmetic units 60 and 68. On the other hand, in the overflow detector 80, the values of the error signal outputs from the arithmetic units 60 and 68 are compared with a prescribed value. As result of comparison, if the number of revolutions of the disk 50 is extremely high to require deceleration, an overflow signal is supplied to the control circuit 79. On the other hand, if the number of revolutions of the disk 50 is close to that during the CAV control or CLV control, supply of the overflow signal is stopped.

The control circuit 79 produces a select signal which permits the selector 81 to produce the decelerating (braking) signal from the input terminal 78 while the overflow signal is output from the overflow detector 80, and to produce the output from the PWM generation circuit 63 when the supply of the overflow signal is stopped. Thus, while the overflow signal is output, the disk 50 is in a decelerating state, and in other cases, the disk 50 will be controlled by the PWM signal.

Incidentally, if it is assumed that the prescribed value in the overflow detector 80 is an error signal value when the duty ratio of the PWM signal is 0% or 100%, the overflow signal is produced when the rotation of the disk is so high as to make it impossible to perform the PWM control. Thus, the accelerating signal can be forcibly sent from the input terminal 78 when the PWM control cannot be permitted. The decelerating signal can be canceled when the PWM control is permitted because the duty ratio of the PWM signal is within a range from 0 to 100%. However, it should be noted that the above prescribed value is not limited to the above error signal value, and may be set at any value permitting the decelerating signal to be canceled when the number of revolutions of the disk 50 lowers from a certain value.

Embodiment 6

Figure 8:
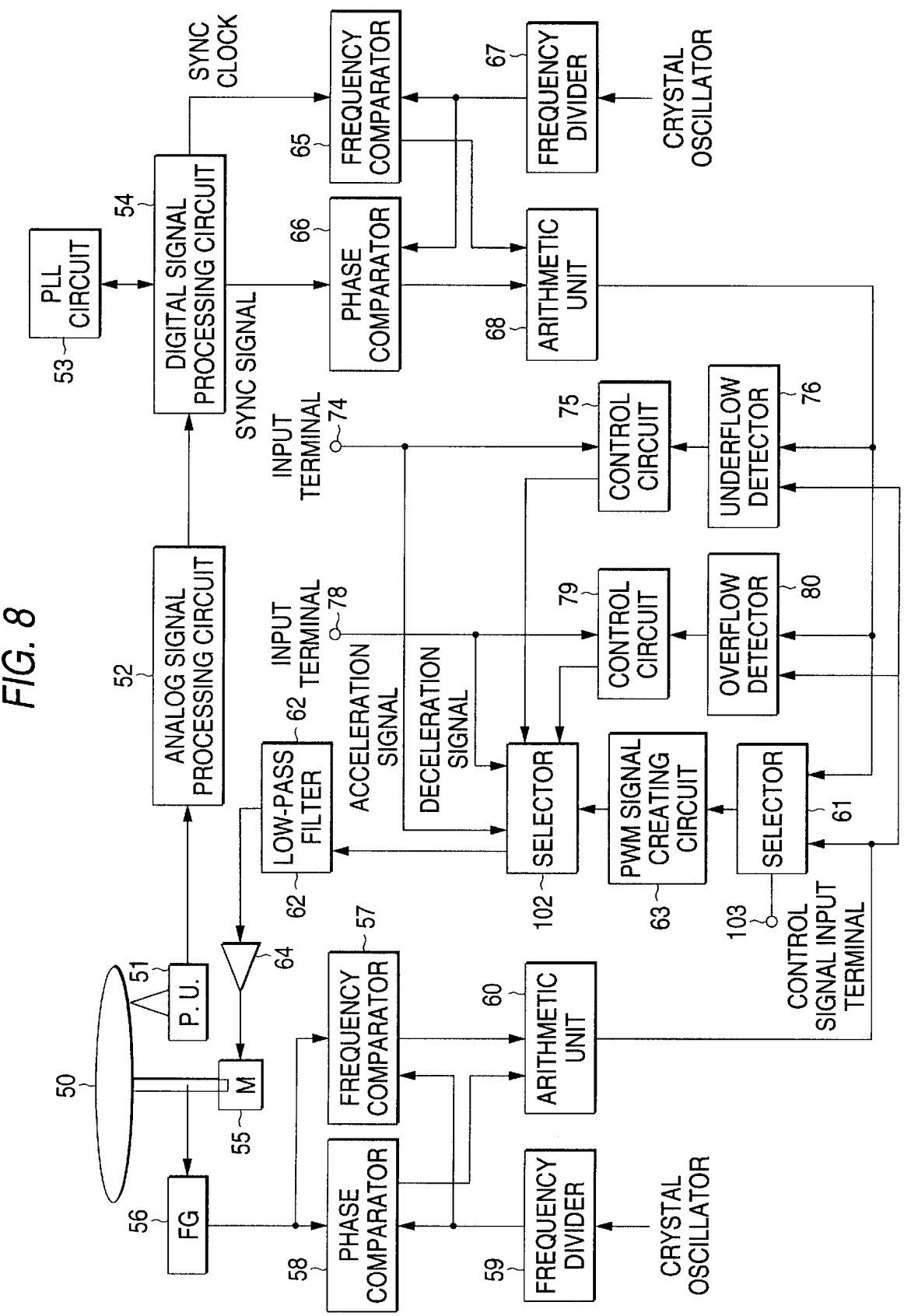
FIG. 8 is a block diagram showing a disk rotation control device according to the sixth embodiment of the present invention.

FIG. 8 is a block diagram showing an example of the disk rotation control device according to the sixth embodiment of the present invention. In FIG. 8, like reference numerals refer to like parts in FIG. 7. In FIG. 8, reference numeral 102 denotes a selector. First, an accelerating (or kicking) signal for the disk, supplied from the input terminal 74, is sent to the selector 102 and also to the control circuit 75. A control signal supplied from the input terminal 103 serves to switch the selector 61 between the outputs from the arithmetic units 60 and 68. On the other hand, in the underflow detector 76, the values of the error signal outputs from the arithmetic units 60 and 68 are compared with a prescribed value. As result of comparison, if the number of revolutions of the disk 50 is extremely low to require acceleration, an underflow signal is supplied to the control circuit 75. On the other hand, if the number of revolutions of the disk is close to that during the CAV control or CLV control, supply of the underflow signal is stopped.

The control circuit 75 produces a select signal which permits the selector 102 to produce the accelerating (kicking) signal from the input terminal 74 while the underflow signal is output from the underflow detector 76, and to produce the output from the PWM generation circuit 63 when the supply of the underflow signal is stopped. Thus, while the underflow signal is output, the disk 50 is in an accelerating state.

A decelerating (or braking) signal for the disk, supplied from the input terminal 78, is sent to the selector 102 and also to the control circuit 79. On the other hand, in the overflow detector 80, the values of the error signal outputs from the arithmetic units 60 and 68 are compared with a prescribed value. As a result of comparison, if the number of revolutions of the disk 50 is extremely high to require deceleration, an overflow signal is supplied to the control circuit 79. On the other hand, if the number of revolutions of the disk 50 is close to that during the CAV control or CLV control, supply of the overflow signal is stopped.

The control circuit 79 produces a select signal which permits the selector 81 to produce the decelerating (braking) signal from the input terminal 78 while the overflow signal is output from the overflow detector 80, and to produce the output from the PWM generation circuit 63 when the supply of the overflow signal is stopped. Thus, while the overflow signal is output, the disk 50 is in a decelerating state. When the underflow signal or overflow signal is not output, the disk 50 is controlled by the PWM signal.

When the disk 50 cannot be placed under the PWM control since its number of revolutions is not equal to the prescribed value, the underflow signal or the overflow signal is produced. Thus, the accelerating or decelerating signal can be forcibly sent. When the PWM control is permitted because the duty ratio of the PWM signal is within a range from 0 to 100%, the accelerating or decelerating signal can be canceled. However, it should be noted that the above prescribed value is not limited to the above error signal value, and may be set at any value permitting the accelerating or decelerating signal to be canceled when the number of revolutions of the disk 50 falls into the other value than a certain value.

Embodiment 7

Figure 9:
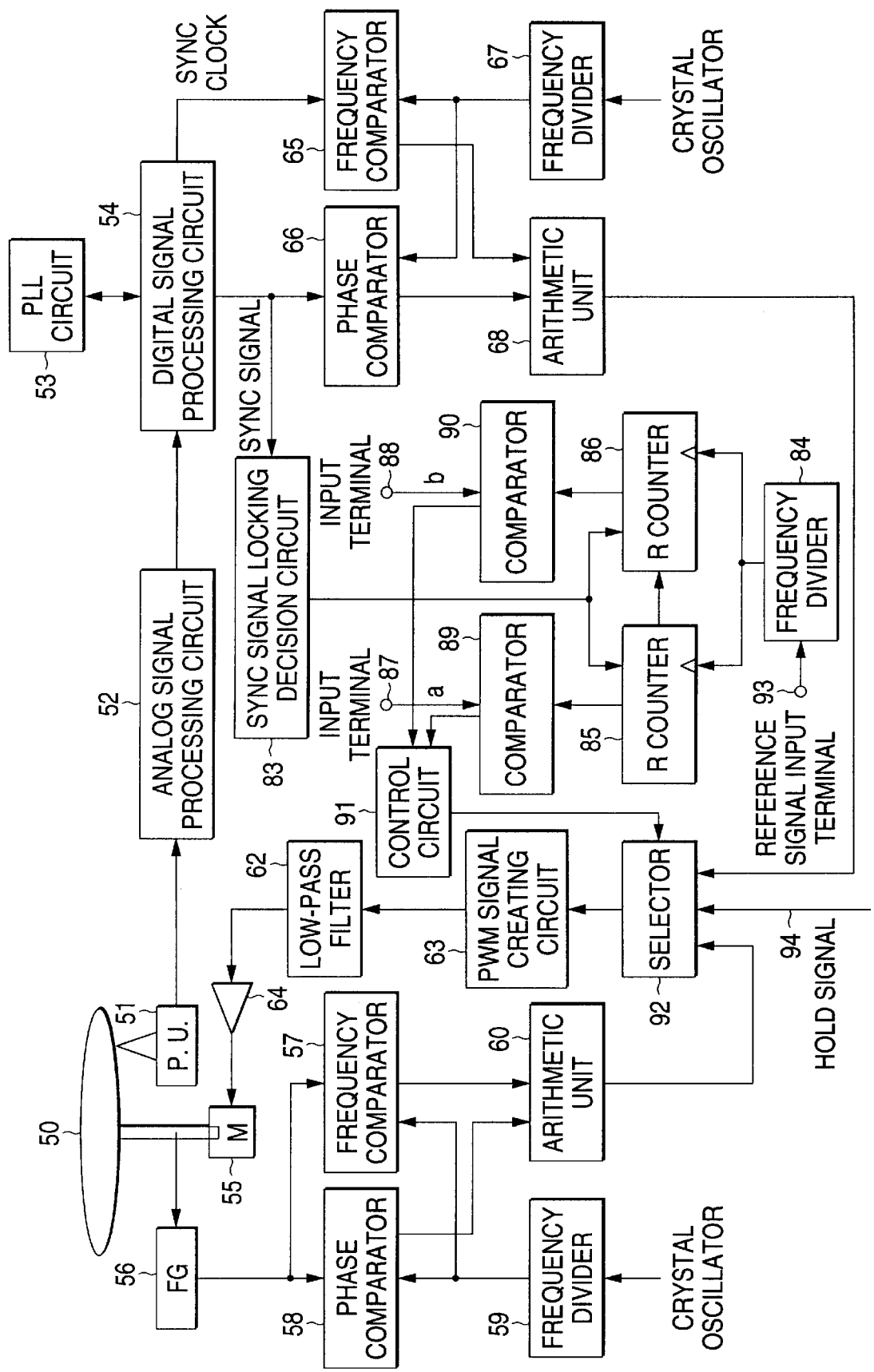
FIG. 9 is a block diagram showing a disk rotation control device according to the seventh embodiment of the present invention.
Figure 10:
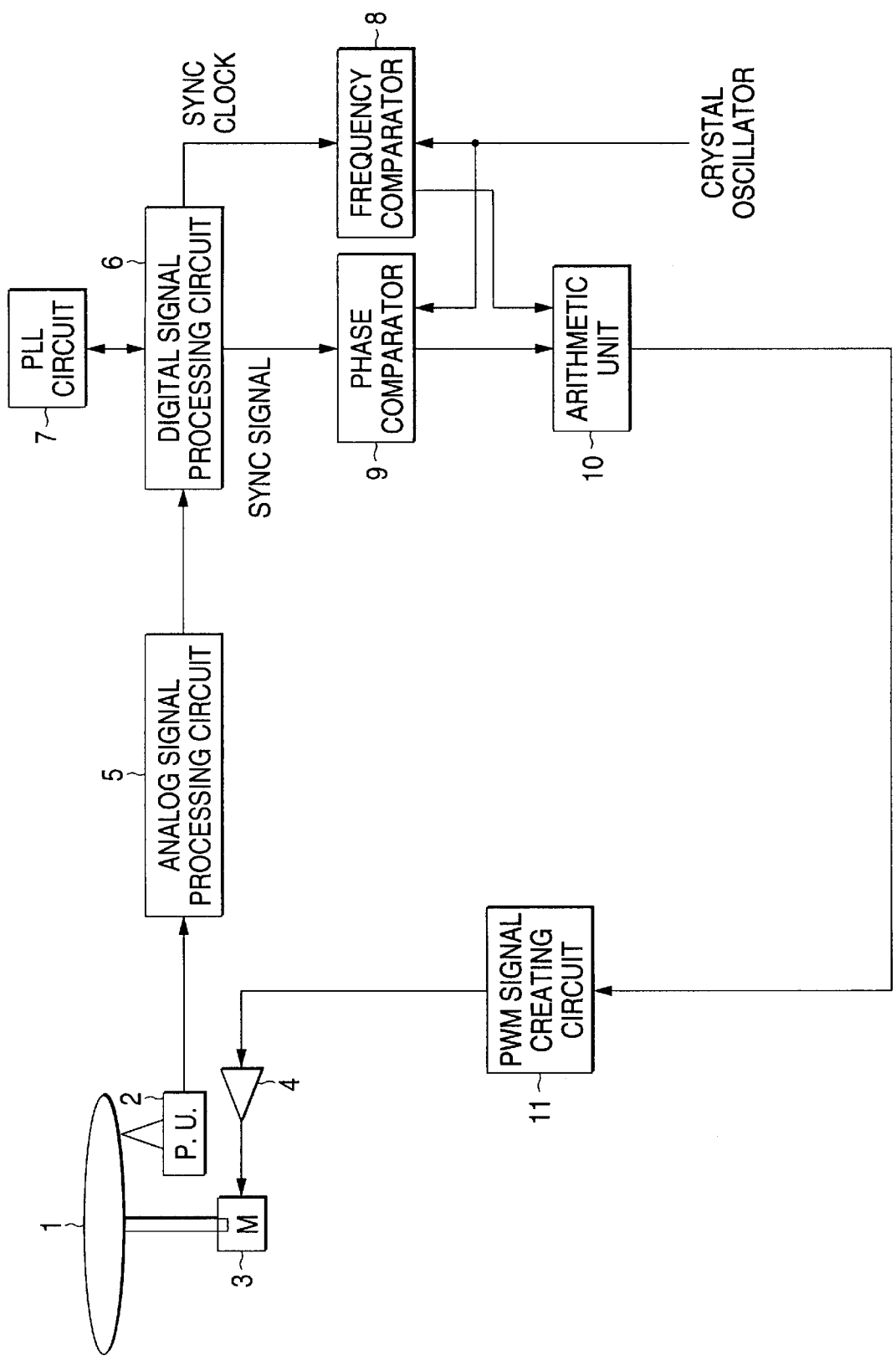
FIG. 10 is a block diagram of a disk rotation control device according to a prior art.

FIG. 9 is a block diagram showing an exemplary disk rotation control device according to the seventh embodiment of the present invention. In FIG. 9, like reference numerals refer to like parts in FIG. 1. In FIG. 9, reference numeral 83 denotes a sync signal locking decision circuit; 84 a frequency divider; 85, 86 a counter; 87 an input terminal for a sector cycle signal; 88 an input terminal of a sector period signal; 89, 90 a comparator; 91 a control circuit; 92 a selector; 93 an input terminal for a reference signal; and 94 a hold signal.

An explanation will be given of the operation of the disk rotation control device according to this embodiment. A sync signal is input from the digital signal processing circuit 54. The synch signal locking decision circuit 83 decides whether or not the sync signal has a prescribed cycle (which is defined by a recording format) with no erroneous detection or dropout thereof. The operation of the sync signal lock decision circuit 83 can be used for decision of the locking of the sync clock of the PLL circuit 53. The decision of locking is a standard for deciding whether or not the reproduced signal is in a correctly readable state. Therefore, if the sync signal is not present over several cycles, it means that the sync clock is not synchronous with the reproduced signal. Thus, the CLV control using such a sync clock is not suitable. In the worst case, the sync clock becomes completely asynchronous. As a result, where it is output as a clock with a fixed cycle, owing to a difference in its cycle from that of the clock from the frequency divider, an accelerating or decelerating error signal is output. This gives rises to an erroneous operation of excess rotation, stopping or reverse rotation. Accordingly, when it is decided by the sync signal locking decision circuit 83 that the sync signal has been input properly, the counters 85 and 86 are reset for each cycle of the sync signal.

On the other hand, the frequency divider 84 frequency-divides the reference signal input from the input terminal 93 into a clock with a prescribed cycle (e.g. that of the sync signal) which is input to the counters 85 and 86. The counters 85 and 86, even when received the clock, is reset for each cycle of the sync signal when the sync signal is properly input thereto. Therefore, the counters 85 and 86 will be reset immediately after they are counted up. However, where the sync signal is not present or erroneously detected, the reset signal is not output form the sync signal locking decision circuit 83. Thus, the counters 85 and 86 are continuously counted up until they are reset owing to proper reception of the sync signal. It should be noted that the counters 85 and 86 are in a cascade connection and the counter 86 is located at a higher bit than the counter 85.

The value a corresponding to a prescribed sector cycle of the reproduced signal, which is supplied from the input terminal 87 (for example, 26 since one sector is composed of 26 frames (cycle of the sync signal) in a DVD-ROM), is compared with the output from the counter 85 by the comparator 89. Further, the value b corresponding to the period of several tens of sectors (for example, 20 corresponding to 20 sectors), which is supplied from the input terminal 88, is compared with the output from the counter 86 by the comparator 90.

If the value from the counter 85 is smaller than a in the comparator 89, i.e. the dropout of the sync signal is smaller than one sector (normal reproduction), the control circuit 91 controls the selector 92 to transfer the output (CLV error signal) from the arithmetic unit 68 to the PWM signal generation circuit 63. If the value from the counter 85 is larger than a, which occurs in track jump, for example), the control circuit 91 issues a hold signal to hold the output from the PWM signal generation circuit 63. Therefore, when there is dropout of the sync signal larger than one sector, the disk 50 is not CLV-controlled but placed in the holding state (in which the disk 50 rotates by inertia with no application of a control voltage to the spindle motor 55). Thus, until the sync clock in the PLL circuit 53 falls in the locking state again, the erroneous operation such as excess rotation, stopping or reverse rotation of the disk 50 can be prevented.

When the disk 50 is kept in the holding state, it will stop its rotation. To prevent this, if the value from the counter 86 is larger than b in the comparator circuit 91, i.e. dropout of the sync signal continues over several tens of sectors (which occurs in off-focusing or off-tracking of the optical pickup), the control circuit 91 controls the selector 92 to transfer the output (CAV error signal) from the arithmetic unit 60 to the PWM signal generation circuit 63. Thus, the disk 50 falls into the control state by the pulse generator 56 and hence continues its rotation.

In the operation described above, according to the condition of dropout of the sync signal, the disk 50 is once fallen into the holding state from the CLV control state and thereafter CAV-controlled. For this reason, at the time of track jump or the like, the disk 50 is prevented from being directly fallen in the CAV control state to change its rotation abruptly. In the holding state, the clock in the PLL circuit 53 is likely to be synchronous again. Accordingly, the values relative to the sector cycle should not be limited to a=26 and b=20 in the above embodiment. Using, as a standard, a =number of dropout of the sync signals at the time of track jump or the like, and a ×b=number of dropout of the sync signals at the time of off-focusing or off-tracking of the optical pickup, these values a and b may be optionally set and input from the input terminals 87 and 88, respectively so that automatic exchange can be realized in the course of CLV control→holding state→CAV control.

The present invention, which is configured as described hitherto, has the following effects.

When a detected value from a signal processing speed means is larger than a prescribed value as a result of comparison by a comparator, the rotation control of a disk is switched from a first control means to a second control means. For this reason, suitable disk rotation control can be made corresponding to a reproducing position of constant angular velocity (CAV) control with emphasis on improvement of access capability on the inner periphery of the disk and a constant liner velocity (CLV) control of putting a check on an increase in the signal processing speed on the outer periphery.

When a detected value from a rotational velocity detecting means is larger than a prescribed value as a result of comparison by the comparator, the rotation control of a disk is switched from the second control means to the first control means. For this reason, on the outer periphery, the signal processing at the highest speed is made under the CLV control, and on the inner periphery, because of shift to the CAV control based on the reduction of the signal processing speed, an increase can be suppressed in the number of revolutions of the spindle motor 55 under the CLV control and hence in the oscillation or power consumption.

When a detected value from a signal processing speed means is larger than a first prescribed value as a result of comparison by a first comparator, the rotation control of a disk is switched from the first control means into the second control means, and when the detected value from a rotational velocity detecting means is larger than a second prescribed value as a result of comparison by a second comparator, the rotation control of a disk is switched from the second control means to the first control means. In this configuration, on the inner periphery of the disk, constant angular velocity (CAV) control is made with emphasis on improvement of access capability and on suppression of an excessive increase in the number of revolutions of the spindle motor and the attendant increase in the oscillation or power consumption; and on the outer periphery of the disk, the signal processing at the highest speed is made under the control linear velocity (CLV) control, thereby putting a check on an increase in the signal processing speed on the outer periphery. According to a reproducing position, optimum control can be performed making the best use of the range of the boundaries of the signal processing capability and the rotation of the spindle motor.

When a velocity error signal is not larger than a prescribed value as a result of detection by a detector, an accelerating signal for accelerating a disk is supplied from an accelerating means to the control means, and when the velocity error signal is not larger than the prescribed value, the accelerating signal is canceled. In this configuration, at the time of start of the disk or track jump requiring acceleration of the disk, the disk can be accelerated in a short time to fall into the CLV control. When the disk is accelerated to the velocity permitting the CLV control, the accelerating signal is automatically canceled to realize simplification and speeding up of disk access.

When the velocity error signal is not smaller than a prescribed value as a result of detection by the detector, a decelerating signal for decelerating a disk is supplied from a decelerating means to the control means, and when the velocity error signal is not smaller than the prescribed value, the decelerating signal is canceled. In this configuration, at the time of track jump requiring deceleration of the disk, the disk can be decelerated in a short time to fall into the CLV control. When the disk is decelerated to the velocity permitting the CLV control, the decelerating signal is automatically canceled to realize simplification and speeding up of disk access.

When the velocity error signal is not larger than the prescribed value as a result of detection by a first detector, the accelerating signal for accelerating the disk is supplied from the accelerating means to the control means, and when the velocity error signal is not smaller than the prescribed value, the accelerating signal is canceled; and when the velocity error signal is not smaller than a prescribed value as a result of detection by a second detector, the decelerating signal for decelerating the disk is supplied from the decelerating means to the control means, and when the velocity error signal is not larger than the prescribed value, the decelerating signal is canceled. In this configuration, at the time of start of the disk or normal track jump requiring acceleration/deceleration of the disk, the disk can be accelerated or decelerated in a short time to fall into the CLV control. When the disk is accelerated or decelerated to the velocity permitting the CLV control, the accelerating/decelerating signal is automatically canceled. A defect of retardation of disk access of the disk subjected to the CLV control can be overcome. In addition, disk access can be simplified and excess rotation of the disk can be prevented by the decelerating means.

When a synchronizing (sync) signal has been detected at prescribed intervals as a result of evaluation by a sync signal evaluating means, a measuring means is initialized, and when the sync signal has not been detected at the prescribed intervals, the intervals are measured using a reference signal by a measuring means. The value measured by the measuring means is compared with a prescribed value by a comparator, and when the former is not smaller than the latter, the control operation is halted and the rotation of the disk is held by a switching means. In such a configuration, when the CLV control cannot be performed owing to dropout of the sync signal, the disk is placed in the holding state (in which the disk 50 rotates by inertia with no application of a control voltage to the spindle motor 55). Thus, until the sync signal is detected at the prescribed intervals again, the erroneous operation such as excess rotation, stopping or reverse rotation of the disk can be prevented.

When the sync signal has been detected at prescribed intervals as a result of evaluation by the sync signal evaluating means, the measuring means is initialized, and when the sync signal has not been detected at the prescribed intervals, the intervals are measured using the reference signal by the measuring means. The value measured by the measuring means is compared with the prescribed value by the comparator, and when the former is not smaller than the latter, the control of disk rotation is switched from the second control means to the first control means by the switching means. In such a configuration, when the CLV control cannot be made owing to dropout of the sync signal for a long time, it is switched into the CAV control. This prevents an erroneous operation such as excess rotation, stopping or reverse rotation of the disk. The disk control is continued even when a long time is required until the sync signal is detected at the prescribed intervals again.

When the synchronizing signal has been detected at prescribed intervals as a result of evaluation by the sync signal evaluating means, the measuring means is initialized, and when the synchronizing signal has not been detected at the prescribed intervals, the intervals are measured using the reference signal by the measuring means. The value measured by the measuring means is compared with a first and second prescribed values by a first comparator and a second comparator, respectively, and when the measured value is not smaller than the first prescribed value, the control of disk rotation is halted and the rotation of the disk is held, and when the measured value is not smaller than the second prescribed value, it is switched from the second control means to the first control means by the switching means. In this configuration, according to the condition of dropout of the sync signal, the disk is once fallen into the holding state from the CLV control state and thereafter CAV-controlled. For this reason, at the time of track jump or the like, the disk is prevented from being directly fallen in the CAV control state to change its rotation abruptly. When there is short time dropout of the sync signal at the time of jump of several tracks, since the disk is in the holding state, the rotation of the disk does not vary so greatly so that the clock in the PLL circuit 53 is likely to be synchronous again. Further, when there is relatively long time dropout of the sync signal such as off-focusing or off-tracking of the optical pickup, the erroneous operation such as excess rotation, stopping or reverse rotation of the disk can be prevented.

What is claimed is:

1. A disk rotation control device comprising:

a signal generation means for generating a signal in synchronism with a reproduced signal from a disk;

CLV control means for controlling the rotation of said disk in terms of a constant linear velocity (CLV) using the signal generated by the signal generation means, and CAV control means for controlling the rotation of said disk in terms of a constant angular velocity (CAV);

a detector for detecting whether or not a velocity error signal is allowable for said CLV control means; and a rotation speed adjusting means for supplying a rotation speed adjusting signal to said one of CLV control means and CAV control means to adjust the rotation speed of said disk when said velocity error signal is not allowable, and canceling the rotation speed adjusting signal when said error signal is allowable.

2. A disk rotation control device as claimed in claim 1, wherein said detector detects whether or not a velocity error signal is equal to or smaller than a lower limit, and said rotation speed adjusting means supplies the rotation speed adjusting signal as an accelerating signal for accelerating said disk when said error signal is equal to or smaller than a lower limit.

3. A disk rotation control device as claimed in claim 1, wherein said detector detects whether or not a velocity error signal is equal to or larger than an upper limit, and said rotation speed adjusting means supplies the rotation speed adjusting signal as a decelerating signal for decelerating said disk when said velocity error signal is equal to or larger than an upper limit.

4. A disk rotation control device as claimed in claim 1, wherein said detector includes first detector for detecting whether or not a velocity error signal is equal to or smaller than a lower limit, and second detector for detecting whether or not a velocity error signal is equal to or larger than an upper limit, said rotation speed adjusting means supplies the rotation speed adjusting signal as an accelerating signal for accelerating said disk when said error signal is equal to or smaller than a lower limit, and supplies the rotation speed adjusting signal as a decelerating signal for decelerating said disk when said velocity error signal is equal to or larger than an upper limit.

5. A disk rotation control device comprising:

signal generation means for generating a signal in synchronism with a reproduced signal from a disk;

CLV means for controlling the rotation of said disk in terms of a constant linear velocity (CLV) using the signal generated by the signal generation means;

synchronizing (sync) signal evaluating means for detecting a sync signal on the basis of a reproduced signal from said disk to decide whether or not the sync signal has been detected at prescribed intervals;

measuring means which is initialized when said sync signal has been detected at prescribed intervals and measures an interval using a reference signal when said sync signal has not been detected at the prescribed intervals;

comparator for comparing a measured value from the measuring means and a prescribed value; and switching means for halting the control operation of said CLV control means and holding the rotation of the disk when said measured value is not smaller than the prescribed value.

6. A disk rotation control device as claimed in claim 5, further comprising:

CAV control means for controlling rotation of the disk in terms of a constant angular velocity (CAV) in response to a pulse for each prescribed rotation of the disk;

wherein said switching means switches the rotation control of said disk from said CLV into said CAV control means when said measured value is not smaller than the prescribed value.

7. A disk rotation control device as claimed in claim 5, further comprising:

CAV control means for controlling rotation of the disk in terms of a constant angular velocity (CAV) in response to a pulse for each rotation of the disk;

wherein said comparator includes a first comparator for comparing a measured value from the measuring means and a first prescribed value, and a second comparator for comparing a measured value from the measuring means and a second prescribed value, and said switching means for halting the control operation of said second control means and holding the rotation of the disk when said measured value is not smaller than the first prescribed value, and switches the rotation control of said disk from said CLV control means to said CAV control means when said measured value is not smaller than the second prescribed value.

8. A disk drive device comprising:

a spindle motor for rotating a disk;

an optical pickup for reading signals from the disk and focus controlling and tracking controlling an optical spot on the disk;

a pulse generator for generating a pulse for each prescribed rotation of the disk;

CAV control means for controlling rotation of the disk in terms of a constant angular velocity (CAV) in response to an output pulse from the pulse generator;

signal generating means for generating a signal in synchronism with a reproduced signal from said disk;

CLV control means for controlling the rotation of the disk in terms of a constant linear velocity (CLV) using the signal generated by said signal generating means;

detecting means for detecting a signal processing speed of said reproduced signal;

comparator for comparing a value of the processing speed detected by said detecting means and a prescribed value; and switching means for switching the rotation control of said disk from said CAV control means into said CLV control means when the value of the signal processing speed detected by said detecting means exceeds said prescribed value.

9. A disk drive device comprising:

a spindle motor for rotating a disk;

an optical pickup for reading signals from the disk and focus controlling and tracking controlling an optical spot on the disk;

a signal generation means for generating a signal in synchronism with a reproduced signal from a disk;

at least one of CLV control means for controlling the rotation of said disk in terms of a constant linear velocity (CLV) using the signal generated by the signal generation means, and CAV control means for controlling the rotation of said disk in terms of a constant angular velocity (CAV);

a detector for detecting whether or not a velocity error signal is allowable for said CLV control means; and a rotation speed adjusting means for supplying a rotation speed adjusting signal to said one of CLV control means and CAV control means to adjust the rotation speed of said disk when said velocity error signal is not allowable, and canceling the rotation speed adjusting signal when said error signal is allowable.

10. A disk drive device comprising:

a spindle motor for rotating a disk;

an optical pickup for reading signals from the disk and focus controlling and tracking controlling an optical spot on the disk;

signal generation means for generating a signal in synchronism with a reproduced signal from a disk;

CLV means for controlling the rotation of said disk in terms of a constant linear velocity (CLV) using the signal generated by the signal generation means;

synchronizing (sync) signal evaluating means for detecting a sync signal on the basis of a reproduced signal from said disk to decide whether or not the sync signal has been detected at prescribed intervals;

measuring means which is initialized when said sync signal has been detected at prescribed intervals and measures an interval using a reference signal when said sync signal has not been detected at the prescribed intervals;

comparator for comparing a measured value from the measuring means and a prescribed value; and switching means for halting the control operation of said CLV control means and holding the rotation of the disk when said measured value is not smaller than the prescribed value.

11. A method of controlling the rotational speed of an information storable disk during scanning comprising:

a) controlling the rotation of the disk to maintain a constant angular velocity when scanning at least a first portion of the disk;

b) controlling the rotation of the disk to maintain a constant linear velocity when scanning at least a second portion of the disk;

c) reading information from said disk to produce an information signal;

d) developing a periodic signal from said information signal read in said step c);

e) switching between said steps a) and b) of controlling based on the periodic signal developed in said step d).

12. The method of claim 11 further comprising:

f) providing a clock signal:

said step e) switching between said step a) of controlling and said step b) of controlling when said periodic signal has a frequency which exceeds a threshold defined by said clock signal.

13. A disk rotation control device for controlling the rotational speed of an information storable disk during scanning thereof, comprising:

a disk drive:

a CAV control controlling said disk drive to rotate said disk at a constant angular velocity;

a CLV control controlling said disk drive to rotate said disk at a constant linear velocity;

a disk reader reading information transferred between said disk and a signal processing circuit;

an information signal synchronization signal generator generating a periodic synchronization signal from said information transferred by said disk reader;

a switching circuit switching between said CAV control and said CLV control based on said periodic synchronization signal.

14. The disk rotation control of claim 13 further comprising:

a periodic reference signal generator;

a comparator comparing said periodic synchronization signal with said periodic reference signal and providing a switch signal to said switching circuit when a fixed relationship is detected therebetween.

15. The disk rotation device of claim 14 wherein said switching circuit is further responsive to a signal related to rotational speed of said disk drive to switch between said CLV control and said CAV control.

16. The disk rotation device of claim 14 wherein said comparator is a frequency comparator.

17. The disk rotation device of claim 14 wherein said comparator is a phase comparator.

* * * * *